US008238902B2

(12) United States Patent
Gustafson et al.

(10) Patent No.: US 8,238,902 B2
(45) Date of Patent: Aug. 7, 2012

(54) WIRELESS DECT PHONE ADAPTOR

(75) Inventors: Pamela K. Gustafson, Overland Park, KS (US); Tony Dandridge, Raymore, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 492 days.

(21) Appl. No.: 12/348,751

(22) Filed: Jan. 5, 2009

(65) Prior Publication Data

US 2010/0173627 A1 Jul. 8, 2010

(51) Int. Cl.
*H04W 76/02* (2009.01)

(52) U.S. Cl. ............... 455/426.1; 455/426.2; 455/465

(58) Field of Classification Search ............. 455/426.1, 455/426.2, 436–439, 444, 552.1, 553.1, 554.1, 455/554.2, 555, 556.1, 557, 462, 465
See application file for complete search history.

(56) References Cited

U.S. PATENT DOCUMENTS

| | | | |
|---|---|---|---|
| 5,325,419 A | 6/1994 | Connolly et al. | |
| 5,384,824 A | 1/1995 | Alvesalo | |
| 5,699,407 A | 12/1997 | Nguyen | |
| 5,924,030 A | 7/1999 | Rautiola et al. | |
| 5,930,712 A * | 7/1999 | Byrne et al. | 455/437 |
| 5,946,616 A | 8/1999 | Schornack et al. | |
| 6,018,672 A | 1/2000 | Werbus | |
| 6,044,267 A | 3/2000 | Foladare et al. | |
| 6,081,534 A | 6/2000 | Sipila | |
| 6,343,220 B1 | 1/2002 | Van Der Salm | |
| 6,487,410 B1 * | 11/2002 | Kontio et al. | 455/437 |
| 7,107,057 B2 * | 9/2006 | Arazi et al. | 455/443 |
| 7,363,045 B2 | 4/2008 | Rogalski et al. | |
| 2002/0019242 A1 * | 2/2002 | Kramer | 455/462 |
| 2009/0061850 A1 * | 3/2009 | Li et al. | 455/426.1 |
| 2009/0122340 A1 * | 5/2009 | Nagahama | 358/1.15 |

FOREIGN PATENT DOCUMENTS

EP  1467548 A1 * 10/2004
WO  WO 97/34433  9/1997

OTHER PUBLICATIONS

Unity™ Telephone, www.eagleid.com/doc/unity.htm (Oct. 28, 2008).
Panasonic KX-TH121B Link-to-Cell Expandable Bluetooth-Enabled DECT 6.0 Phone System, (Bluetooth/Landline), Dec. 15, 2008.
ETSI, Technical Report, *Digital Enhanced Cordless Telecommunications (DECT); New Generation DECT; Overview and Requirements*, 2007.
DECT Forum, *DECT—The Standard Explained*, Feb. 1997.
ETSI, *Digital Enhanced Cordless Telecommunications (DECT); Common Interface (CI); Paqrt 1: Overview*, 2008.
ETSI, *Digital Enhanced Cordless Telecommunications (DECT); Generic Access Profile (GAP)* 2008.

* cited by examiner

*Primary Examiner* — Cong Tran
(74) *Attorney, Agent, or Firm* — Swanson & Bratschun, L.L.C.

(57) ABSTRACT

An embodiment of a method for initiating an outgoing call from a cellular handset to a fixed network using a DECT base station includes receiving an outgoing call request from a cellular handset by an adaptor module in communication with the cellular handset. The outgoing call request includes a request to establish a call session with a communication device over a fixed network. The method further includes sending a call set-up message to a DECT base station in response to receiving the outgoing call request. The DECT base station is configured to initiate an outgoing call to the communication device over the fixed network in response receiving the call set-up message. The method further includes receiving a call connect message from the DECT base station, and establishing a call session between the cellular handset and the communication device.

17 Claims, 5 Drawing Sheets

WIRELESS DECT PHONE ADAPTOR

BACKGROUND

DECT or Digital Enhanced Cordless Telecommunications is an European Telecommunications Standards Institute (ETSI) standard for digital portable phones such as cordless home telephones. Although DECT was developed by the ETSI, it has since been adopted by many countries all over the world. The original DECT frequency band (1880 MHz-1900 MHz) is used in all countries in Europe. Outside of Europe, it is used in most of Asia, Australia and South America. In the United States, the Federal Communications Commission (FCC) changed channelization and licensing costs in a nearby band (1920 MHz-1930 MHz, or 1.9 GHz), known as Unlicensed Personal Communications Services (UPCS), allowing DECT devices to be sold in the United States with only minimal changes. These channels are reserved exclusively for voice communication applications and are therefore less likely to experience interference from other wireless devices, such as baby monitors and wireless networks. DECT devices made for use in the United States use the designation DECT 6.0 to distinguish them from both DECT devices used elsewhere and U.S. cordless equipment operating in the 900 MHz, 2.4 GHz and 5.8 GHz ISM bands. The DECT standard fully specifies procedures for a portable unit, such as a cordless telephone, to access a fixed telecommunication network via radio frequency transmissions. Connectivity to the fixed network is performed through a base station, or "Radio Fixed Part", to terminate the radio link from a DECT handset and connect calls to the fixed network. In many cases, the base station connection is to the public switched telephone network (PSTN). In addition, DECT connectivity with newer technologies, such as Voice over IP (VoIP), has also become available. In a typical application of DECT in domestic cordless telephony, a single base station may be used to connect one or more DECT handsets to the fixed network.

SUMMARY

An embodiment of a method for initiating an outgoing call from a cellular handset to a fixed network using a DECT base station includes receiving an outgoing call request from a cellular handset by an adaptor module in communication with the cellular handset. The outgoing call request includes a request to establish a call session with a communication device over a fixed network. The method further includes sending a call set-up message to a DECT base station in response to receiving the outgoing call request. The DECT base station is configured to initiate an outgoing call to the communication device over the fixed network in response receiving the call set-up message. The method further includes receiving a call connect message from the DECT base station, and establishing a call session between the cellular handset and the communication device.

An embodiment of a method for receiving an incoming call from a fixed network by a cellular handset using a DECT base station includes receiving a call set-up message from the DECT base station by an adaptor module. The call set-up message is associated with an incoming call from a communication device over the fixed network. The method further includes sending an incoming call request to a cellular handset in communication with the adaptor module. The incoming call request includes a request to establish a call session with the communication device. The method still further includes receiving an incoming call acknowledgement from the cellular handset, sending a call connect message to the DECT base station, and establishing a call session between the cellular handset and the communication device.

An embodiment of an apparatus includes a data interface configured to be coupled to a data port of a cellular handset, a DECT transceiver, and at least one processor. The at least one processor is configured to establish a call session between a cellular handset and a communication device over a fixed network. The at least one processor is further configured to receive DECT voice data associated with the call session from a DECT base station via the DECT transceiver. The DECT base station is in communication with the fixed network. The at least one processor is further configured to convert the DECT voice data to cellular voice data, and send the cellular voice data to the cellular handset via the data interface.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
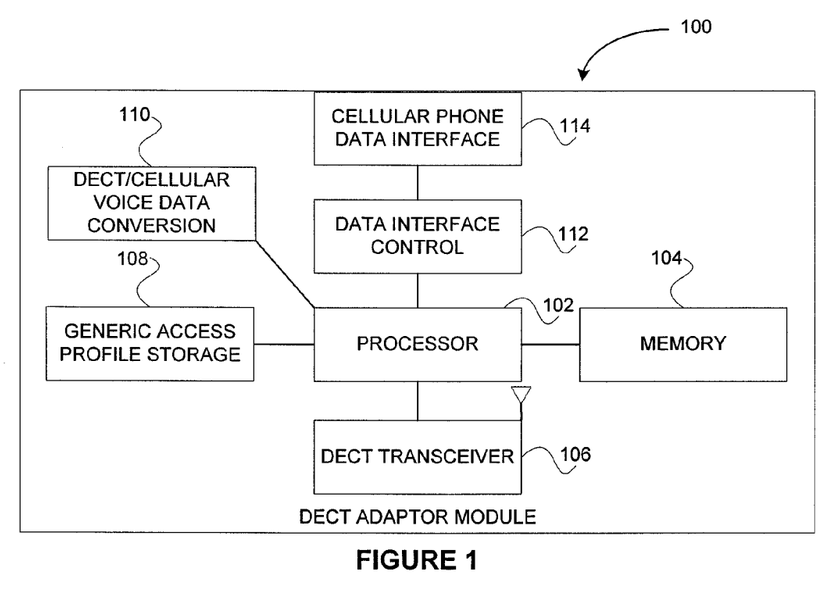
FIG. 1 is an embodiment of a Digital Enhanced Cordless Telephone (DECT) adaptor module.

FIG. 1 is an embodiment of a Digital Enhanced Cordless Telephone (DECT) adaptor module 100. The DECT adaptor module 100 includes a processor 102 in communication with a memory 104. The processor 102 is in further communication with a DECT transceiver 106, a Generic Access Profile (GAP) storage 108, a DECT/cellular voice data conversion module 110, and a data interface control module 112. The data interface control module 112 is in further communication with a cellular phone data interface 114. In various embodiments, the DECT adaptor module 100 is configured to be coupled to a data port of a cellular handset to allow the cellular handset to interoperate with a DECT base station as a DECT handset. In various embodiments, the DECT adaptor module 100 allows a user of the cellular handset to receive incoming calls and initiate outgoing calls to communication device a fixed network using a DECT base station.

In various embodiments, the processor 102 is configured to retrieve computer readable instructions from the memory 104 to perform various functions of the DECT adaptor module 100 described herein. The DECT transceiver 106 is configured to transmit and receive DECT radio signals with a DECT base station using a DECT radio interface. In a particular embodiment, the DECT transceiver 106 uses a frequency division multiple access (FDMA), a time division multiple access (TDMA), and time division duplex (TDD), radio interface to communicate with a DECT base station. The GAP storage 108 stores a Generic Access Profile (GAP) which describes a set of requirements to allow a conforming DECT base station to interoperate with a conforming DECT portable handset in order to provide basic telephony services in a DECT system. The GAP ensures interoperation at the air interface between the DECT handset and the DECT base station, and describes procedures to establish, maintain and release telephone calls. The GAP also describes procedures for registering and subscribing a DECT handset to a DECT base station.

The DECT/cellular voice data conversion module 110 is configured to receive voice data formatted for the DECT air interface (hereafter referred to as "DECT voice data") from the DECT transceiver 106, and convert the DECT voice data to voice data that is formatted for being understood by one or more cellular handsets (hereafter referred to as "cellular voice data"). The DECT/cellular voice data conversion module 110 is further configured to receive cellular voice data from a cellular handset, and convert the cellular voice data to DECT voice data compliant with transmission over the DECT air interface by the DECT transceiver 106. In one embodiment, the DECT/cellular voice data conversion module 110 is a software module including computer-readable instructions executable by one or more processors, such as processor 102. In another embodiment, the DECT/cellular voice data conversion module 110 is a hardware module including one or more processors and/or ASICs. The data interface control module 112 is configured to control the sending and receiving of voice and other data over the cellular phone data interface 114. In a particular embodiment, the DECT/cellular voice data conversion module 110 is configured to convert voice data to be compatible for a particular cellular handset. In another embodiment, the DECT/cellular voice data conversion module 110 is configured to be compatible with more than one type and/or brand of cellular handset.

Figure 2:
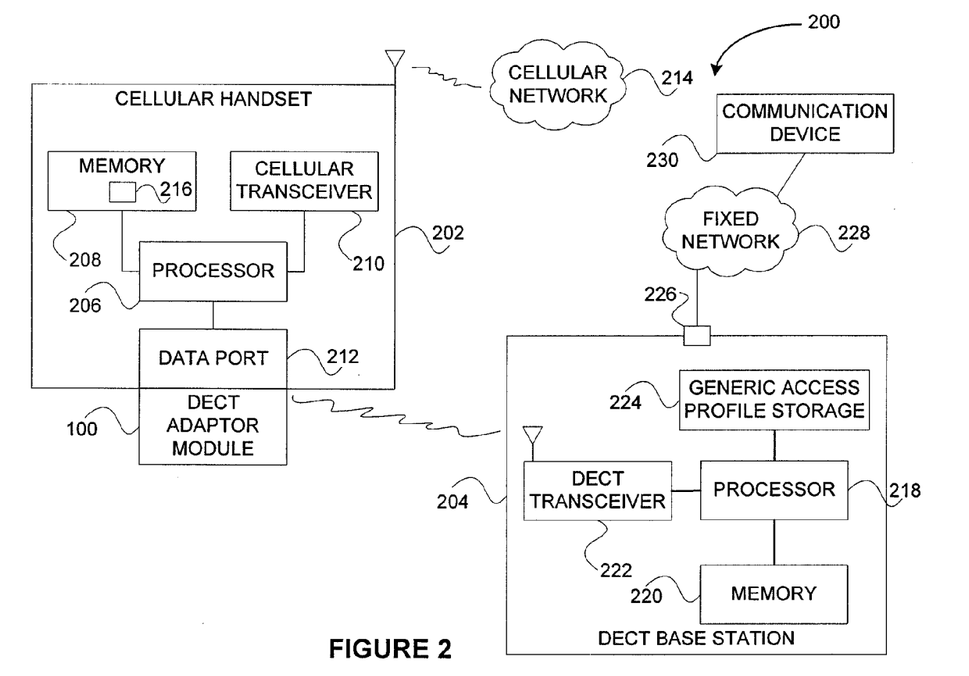
FIG. 2 is an embodiment of a system for facilitating communication between a cellular handset and a DECT base station using the DECT adaptor module.

FIG. 2 is an embodiment of a system 200 for facilitating communication between a cellular handset 202 and a DECT base station 204 using the DECT adaptor module 100. The processor 206 is configured to retrieve computer readable instructions from the memory 208 and execute the computer readable instructions to perform various functions of a cellular handset 202, as described herein. The cellular transceiver 210 is configured to allow a user of the cellular handset 202 to initiate and receive cellular telephone calls with a cellular network 214. In one embodiment, the cellular network 214 is a GSM network. In another embodiment, the cellular network 214 is a CDMA network. The data port 212 is configured to allow the cellular handset 202 to transmit and receive data with an external device such as a cellular handset accessory device. In various embodiments, the data port 212 is coupled to the cellular phone data interface 114 of the DECT adaptor module 100 to allow the cellular handset 202 to transmit and receive data with the DECT adaptor module 100. In one embodiment, the data port 212 is a Universal Serial Bus (USB) port. In another embodiment, the data port 212 is a Secure Digital (SD), miniSD, or microSD port. In still another embodiment, the data port 212 is a Subscriber Identity Module (SIM) card port. Although the illustrated embodiment shows the DECT adaptor module 100 as an external device coupled to the cellular handset 202, it should be understood that in other embodiments the DECT adaptor module 100 may be installed internally in the cellular handset 202.

The DECT base station 204 includes a processor 218, a memory 220, a DECT transceiver 222, and a GAP storage 224. The processor 218 is configured to retrieve computer readable instructions from the memory 202 and execute the computer readable instructions to perform the various functions of the DECT base station 204, described herein. The DECT transceiver 222 is configured to transmit and receive data between the DECT base station 204 and one or more DECT portable devices, such as the DECT adaptor module 100, over a DECT air interface. The GAP storage 224 is configured to store a GAP, which is a profile that describes a set of mandatory requirements to allow the DECT base station 204 to interoperate with one or more DECT compliant portable devices, such as the DECT adaptor module 100. In at least one embodiment, the DECT adaptor module 100 and the DECT base station 204 interoperate using a DECT standard as specified by the ETSI such as described in ETSI TR 102 570, ETSI EN 300 444, or ETSI EN 300 175-1. The DECT base station 204 further includes a fixed network interface 226 configured to connect the DECT base station 204 to a fixed network 228. In a particular embodiment, the fixed network is a PSTN. In another embodiment, the fixed network 228 is an Internet Protocol (IP) network. Alternatively, the fixed network 228 may be any other wired network such as, for example, a fiber optic network. In still other embodiments, the DECT base station 204 may be configured to be coupled with a number of fixed networks. In a particular embodiment, the fixed network interface 226 is an RJ11 interface. In various embodiments, a communication device 230 may be in communication with or connected to the fixed network 228 to allow a user of the communication device 230 to send and receive phone calls and establish call sessions with the DECT base station 204 over the fixed network 228. In at least one embodiment, the communication device 230 is a telephone.

In accordance with various embodiments, a user of the cellular handset 202 may send and receive phone calls over both the cellular network 214 using the built-in capabilities of the cellular handset and over the fixed network 228 using the capabilities provided by the DECT adaptor module 100. When operating in a cellular mode, the cellular handset 202 may initiate and receive calls with the cellular network 214, and voice transmissions between the DECT adaptor module 100 and the DECT base station 204 are disabled. The memory 208 of the cellular handset 202 includes a DECT software application 216. In a particular embodiment, the DECT software application 216 may be downloaded to the memory 208 of the cellular handset 202 by a user of the cellular handset 202. In another embodiment, the DECT software application 216 may be stored in the memory 208 by a provider or manufacturer of the cellular handset 202. The DECT software application 216 is configured to allow the cellular handset 202 to exchange voice data, messages, and other data with the DECT adaptor module 100, and interoperate with the DECT adaptor module 100 to facilitate various DECT functions of the cellular handset 202 and the DECT adaptor module 100 as described herein. When operating in a DECT mode, the cellular handset 202 is configured to communicate with the DECT base station 204 via the DECT adaptor module 100, and the cellular transceiver 210 of the cellular handset 202 is disabled so that voice transmissions between the cellular handset 202 and the cellular network 214 are disabled. This allows a user of the cellular handset 202 to send and receive calls with communication device 230 over the fixed network 228. In some embodiments, the DECT base station 204 may be further provided with a charging unit capable of charging the cellular handset 202 and/or the DECT adaptor module 100 when a charging port of the cellular handset 202 or the DECT adaptor module 100 is coupled to the charging unit. An advantage offered in at least one embodiment, is that a user may use their cellular handset 202 as a DECT handset without consuming wireless billing units while still maintaining the use of the cellular capabilities of the cellular handset 202.

Figure 3:
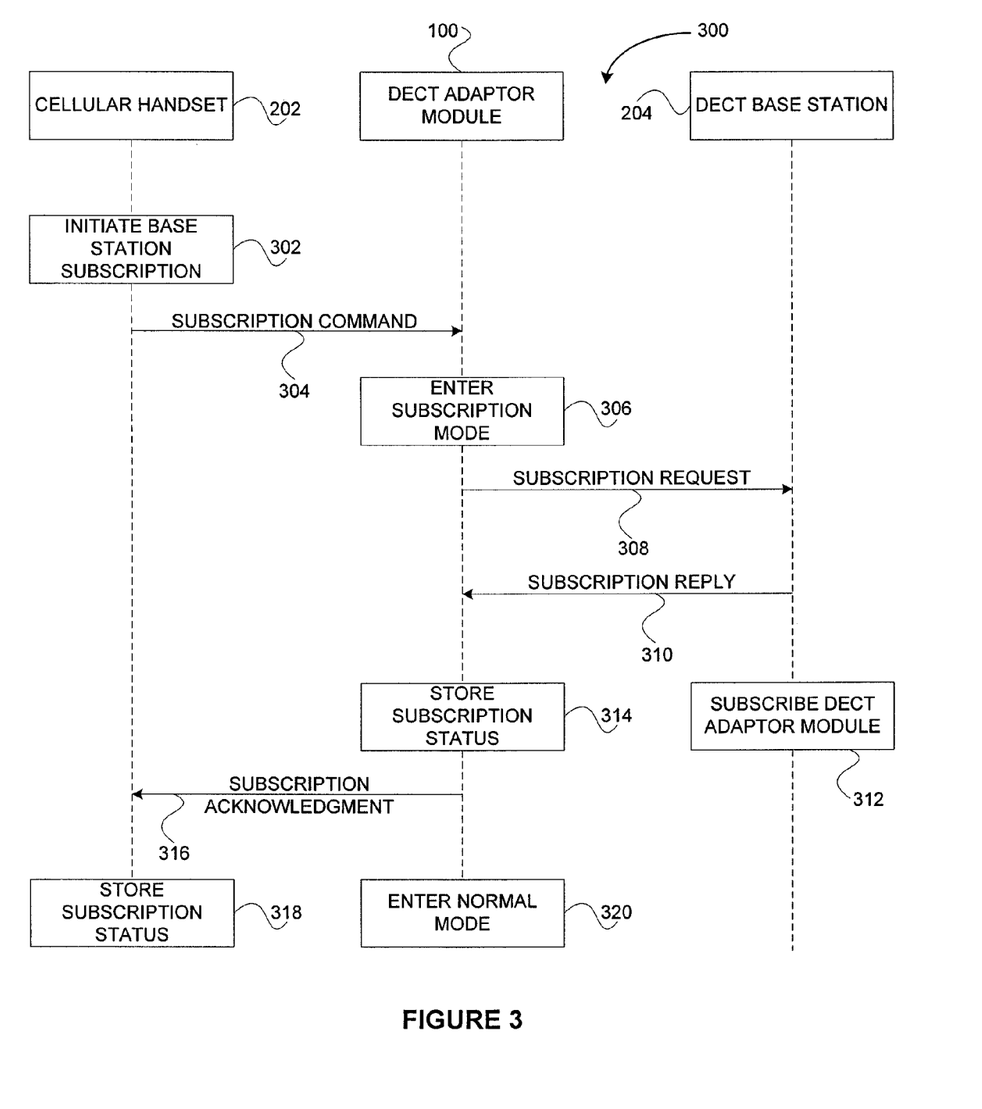
FIG. 3 is an embodiment of a procedure for subscribing the DECT adaptor module with the DECT base station.

FIG. 3 is an embodiment of a procedure 300 for subscribing the DECT adaptor module 100 with the DECT base station 204. Before a DECT portable device, such as a DECT handset, may be used with a DECT base station 204, the DECT portable device must be subscribed or registered with the DECT base station 204. In step 302, a user of the cellular handset 202 initiates a base station subscription procedure. In a particular embodiment, the user initiates base station subscription by selecting a subscription option in a user interface provided by a DECT software application 216. In still other embodiments, the DECT software application 216 may initiate base station subscription automatically. In step 304, the cellular handset 202 sends a subscription command to the DECT adaptor module 100 via the data port 212. Upon receiving the subscription command via the cellular phone data interface 114, the DECT adaptor module 100 enters a subscription mode in step 306. In step 308, the DECT adaptor module 100 sends a subscription request to the DECT base station 204. In response to receiving the subscription request, the DECT base station 204 sends a subscription reply to the DECT adaptor module 100. In at least one embodiment, the DECT adaptor module 100 and DECT base station 204 authenticate the subscription request using a subscription key. In a particular embodiment, a subscription key corresponding to a subscription key associated with the DECT base station 204 may be entered by the user of the cellular handset 202 during the initiation of the base station subscription. Accordingly, both the DECT adaptor module 100 and the DECT base station 204 may verify the subscription of the DECT adaptor module 100 with the DECT base station 204 to ensure that an unauthorized subscription to the DECT base station 204 is not performed.

In step 312, the DECT base station 204 subscribes the DECT adaptor module 100 with the DECT base station 204, thus allowing the DECT adaptor module 100 to send and receive calls with the DECT base station 204. In step 314, the DECT adaptor module 100 stores the subscription status of the DECT adaptor module 100 with the DECT base station 204. In step 316, the DECT adaptor module 100 sends a subscription acknowledgment message to the cellular handset 202. In step 318, the cellular handset 202 stores the subscription status of the DECT adaptor module 100 with the DECT base station 204 in memory 208. In step 320, the DECT adaptor module 100 enters a normal mode in which the DECT adaptor module 100 is configured to allow the cellular handset 202 to place and receive calls using the DECT base station 204.

Figure 4:
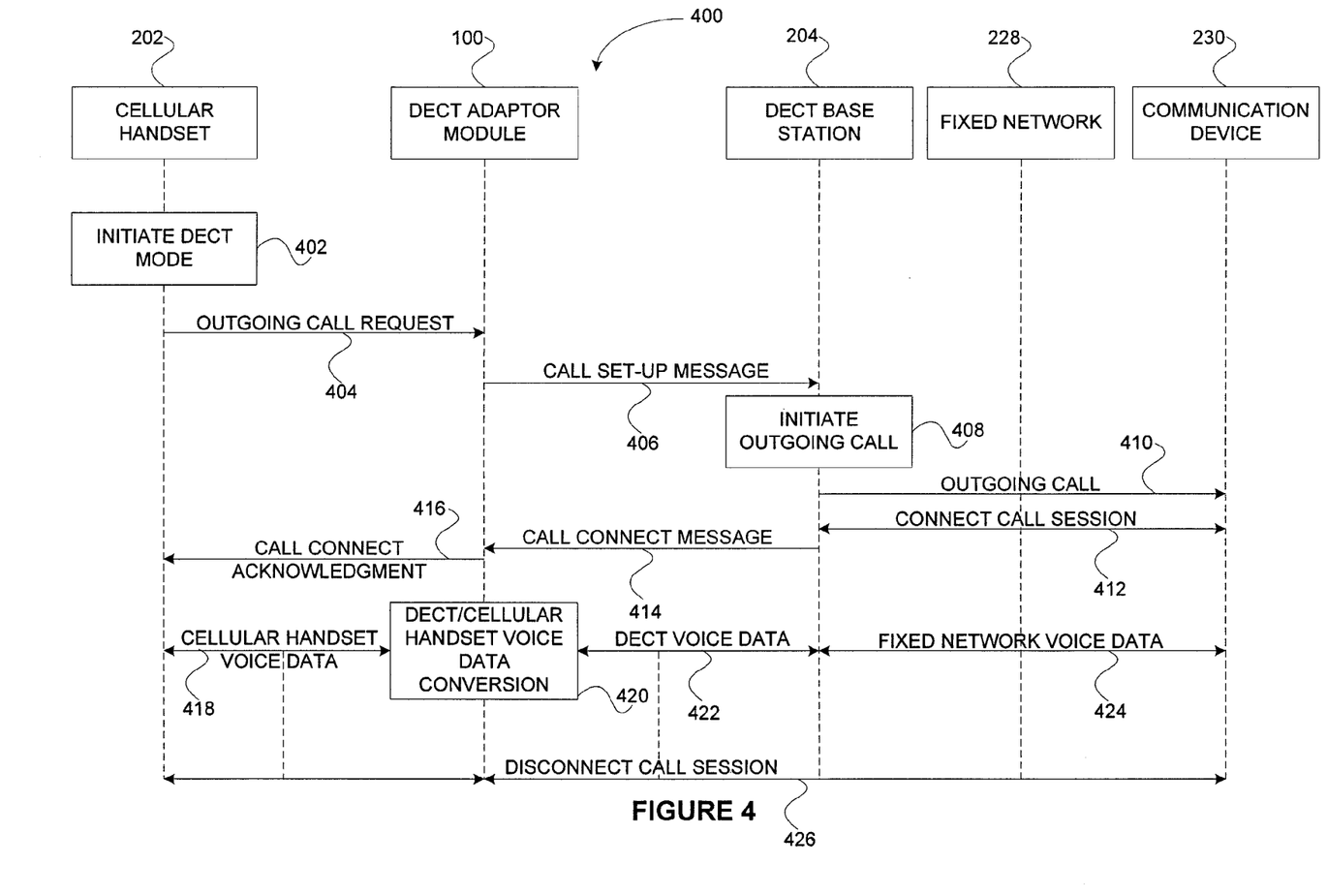
FIG. 4 is an embodiment of a procedure for initiating an outgoing call using the DECT adaptor module.

FIG. 4 is an embodiment of a procedure 400 for initiating an outgoing call using the DECT adaptor module 100. In the embodiment illustrated in FIG. 4, the user of the cellular handset 202 wishes to place an outgoing call to the communication device 230 using the DECT base station 204 and the fixed network 228. In step 402 of the user of the cellular handset 202 initiates the DECT mode of the cellular handset 202. In a particular embodiment, the user initiates the DECT mode by selecting a DECT option on a user interface provided by the DECT software application 216. In step 404, the cellular handset 202 sends an outgoing call request to the DECT adaptor module 100. The outgoing call request includes a request to establish a call session with a the communication device 230 over the fixed network 228. In at least one embodiment, the outgoing call request is initiated by the user of the cellular handset 202 dialing a telephone number associated with the communication device 230 using a keypad of the cellular handset 202. In an alternative embodiment, the user of the cellular handset 202 initiates the outgoing call request by selecting a contact associated with the communication device 230 from a contacts list provided by a user interface of the cellular handset 202.

In response to receiving the outgoing call request, the DECT adaptor module 100 sends a call set-up message to the DECT base station 204 in step 406. In step 408, the DECT base station 204 initiates an outgoing call in response to receiving the call set-up message. In step 410, the DECT base station 204 sends an outgoing call to the communication device 230 over the fixed network 228. In step 412, a call session is connected between the DECT base station 204 and the communication device 230 if the outgoing call is answered by the communication device 230. In an alternative embodiment, the procedure 400 is terminated if the communication device 230 does not answer the outgoing call. In step 414, the DECT base station 204 sends a call connect message to the DECT adaptor module 100. In response to receiving the call connect message, the DECT adaptor module 100 sends a call connect acknowledgment to the cellular handset 202 in step 416. As a result, a call connection is established between the cellular handset 202 and the communication device 230.

In step 418, cellular handset voice data is transmitted from the cellular handset 202 to the DECT adaptor module 100. In various embodiments, the cellular handset voice data is generated by the user of the cellular handset 202 speaking into a microphone of the cellular handset 202. In step 420, the DECT/cellular voice data conversion module 110 of the DECT adaptor module 100 converts and/or translates the cellular voice data to DECT voice data. In step 422, the DECT adaptor module 100 transmits the DECT voice data to the DECT base station 204 over the DECT air interface. In step 424, the DECT base station 204 converts the DECT voice data to fixed network voice data and sends the fixed network voice data to the communication device 230. Similarly, fixed network voice data received from the communication device 230 by the DECT base station 204 via the fixed network 228 is sent to the DECT adaptor module 100 as DECT voice data. The DECT/cellular voice data conversion module 110 converts and/or translates the DECT voice data to cellular handset voice data compatible with the cellular handset 202. The DECT adaptor module 100 transmits the cellular voice data to the data port 212 of the cellular handset 202 via the cellular data interface 114. The procedure 400 allows voice communication between users of the cellular handset 202 and the communication device 230 by establishing a call session over the fixed network 228. After the call session is completed, the call session is disconnected in set 426. In at least one embodiment, the call session may be disconnected by either the user of the cellular handset 202 or the user of the communication device 230 hanging up the connection.

Figure 5:
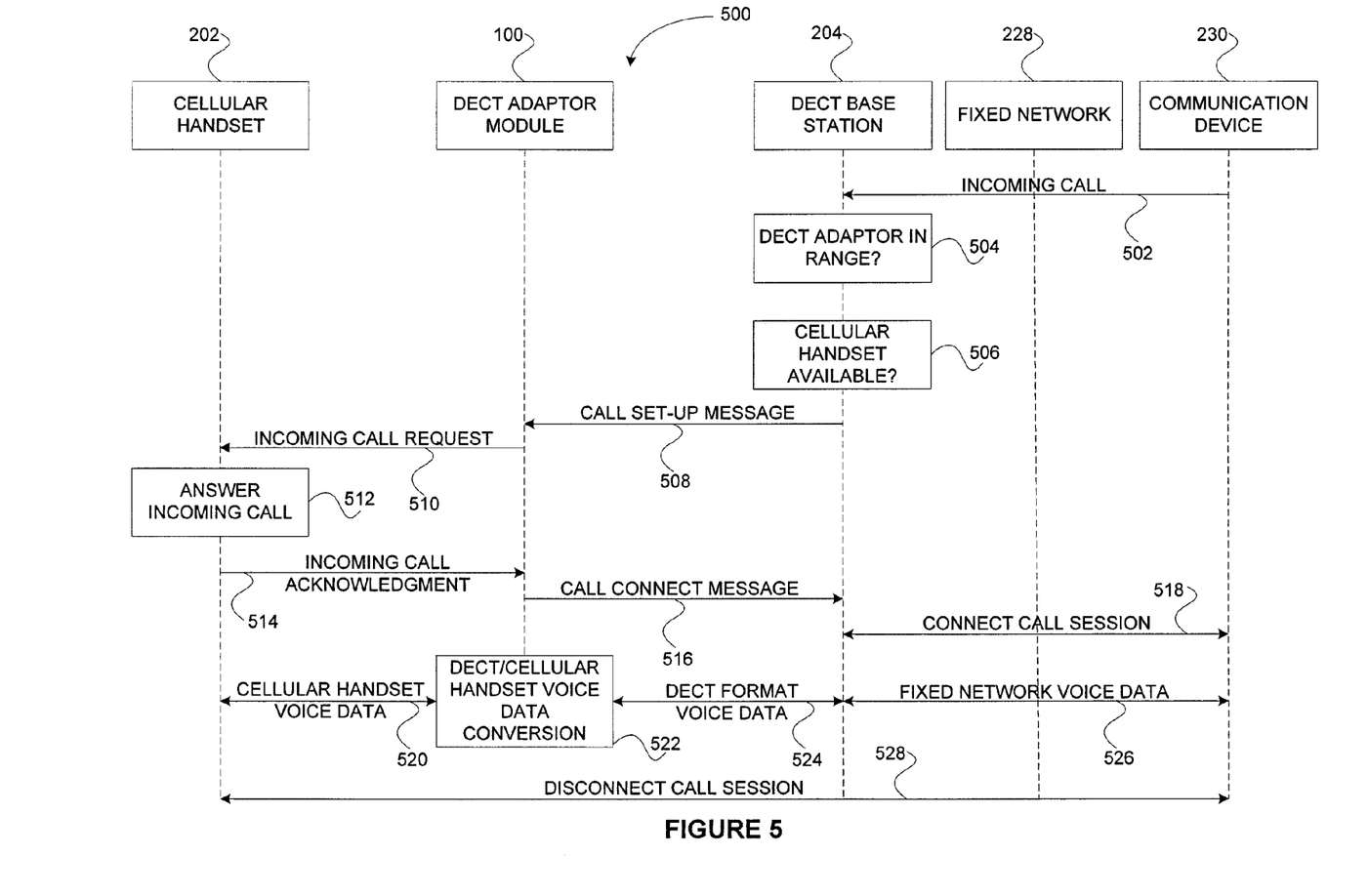
FIG. 5 is an embodiment of a procedure for receiving an incoming call using the DECT adaptor module.

FIG. 5 is an embodiment of a procedure 500 for receiving an incoming call using the DECT adaptor module 100. In step 502, an incoming phone call is received by the DECT base station 204 from the communication device 230 over the fixed network 228. In step 504, the DECT base station determines whether the DECT adaptor module 100 is within range of the DECT base station 204. In a particular embodiment, the DECT base station 204 determines whether the DECT adaptor module 100 is within range of the DECT base station 204 by measuring a signal strength of a signal transmitted by the DECT adaptor module 100. In step 506, the DECT base station 204 determines whether the cellular handset 202 is available to accept an incoming call from the fixed network 228 if the DECT adaptor module 100 is within range of the DECT base station 204. In a particular embodiment, the DECT base station 204 determines whether the cellular handset 202 is available by determining whether the cellular handset 202 is currently in a call session using the cellular network 214. If the cellular handset 202 is not in a call session using the cellular network 214, the cellular handset 202 is determined to be available to accept an incoming call from the fixed network 228. Alternatively, if the DECT adaptor module 100 is not within range of the DECT base station 204, or the cellular handset 202 is not available, the procedure 500 ends. In some embodiments, the incoming call may be answered by one of other DECT portable devices also subscribed to the DECT base station 204. In still other embodiments, the incoming call may be sent to voicemail if the DECT adaptor module 100 is not within range or the cellular handset 202 is not available.

In step 508, the DECT base station 204 sends a call set-up message to the DECT adaptor module 100. In response to receiving the call set-up message, the DECT adaptor module 100 sends an incoming call request message to the cellular handset 202 in step 510. The incoming call request includes a request to establish a call session with the communication device 230. In step 512, the user of the cellular handset 202 answers the incoming call. In response to the user answering the incoming call, the cellular handset 202 sends an incoming call acknowledgment message to the DECT adaptor module 100 in step 514. In step 516, the DECT adaptor module 100 sends a call connect message to the DECT base station 204 in response to receiving the incoming call acknowledgment. In step 518, a call session between the DECT base station 204 and the communication device 230 is connected and as a result the call session is established between the cellular handset 202 and the communication device 230.

In step 520, cellular handset voice data is transmitted from the cellular handset 202 to the DECT adaptor module 100. In step 522, the DECT/cellular voice data conversion module 110 of the DECT adaptor module 100 converts and/or translates the cellular voice data to DECT voice data. In step 524, the DECT adaptor module 100 transmits the DECT voice data to the DECT base station 204. In step 526, the DECT base station converts the DECT voice data to fixed network voice data and sends the fixed network voice data to the communication device 230. Similarly, the fixed network voice data received from the communication device 230 by the DECT base station 204 is sent to the DECT adaptor module 100 as DECT voice data. The DECT/cellular voice data conversion module 110 converts and/or translates the DECT voice data to cellular handset voice data. The DECT adaptor module 100 transmits the cellular voice data to the cellular handset 202 via the cellular data interface 114, and the cellular handset 202 receives the cellular handset voice data via the data port 212. The procedure 500 allows voice communication between users of the cellular handset 202 and the communication device 230 over the fixed network 228. After the call session is completed, the call session is disconnected in step 528. In at least one embodiment, the call session may be disconnected by either the user of the cellular handset 202 or the user of the communication device 230 hanging up the connection.

Figure 6:
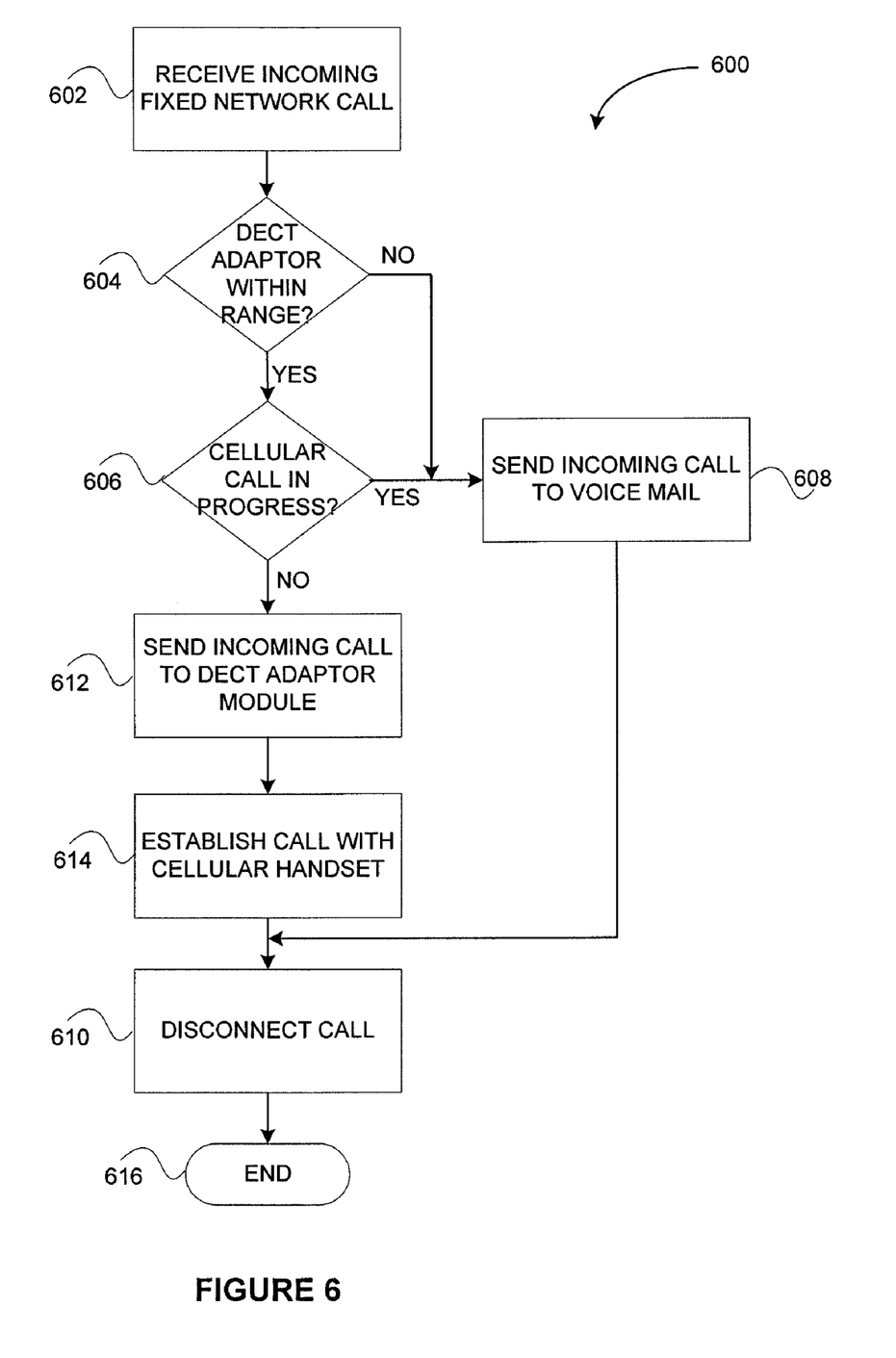
FIG. 6 is an embodiment of a procedure for receiving an incoming call and sending the incoming call to voicemail if the cellular handset is not available.

FIG. 6 is an embodiment of a procedure 600 for receiving an incoming call and sending the incoming call to voicemail if the cellular handset 202 is not available. In step 602, an incoming call from the fixed network 228 is received by the DECT base station 204. In step 604, the DECT base station 204 determines whether the DECT adaptor module 100 is within range of the DECT base station 204. If the DECT adaptor module 100 is within range, the DECT base station 204 determines whether the cellular handset 202 has a call in progress using the cellular network 214 in step 606. If the DECT adaptor module 100 is not within range or a cellular call is in progress, the procedure 600 continues to step 608. In step 608, the incoming call is sent to a voicemail system, and the caller is prompted to leave a voicemail for the user of cellular handset 202. In at least one embodiment, the voicemail system is provided by the DECT base station 204. In still other embodiments, the voicemail system and/or services may be provided from the fixed network 228. After sending an incoming call to voicemail, the procedure continues to step 610 in which the call is disconnected. If a cellular call is not in progress, the procedure continues to step 612 in which the incoming call is sent by the DECT base station 204 to the DECT adaptor module 100. In step 614, a call is established with the cellular handset 202 and the incoming caller. The procedure 600 then continues to step 610 in which the call is disconnected. In step 616 the procedure 600 ends.

The illustrative embodiments can take the form of an entirely hardware embodiment, an entirely software embodiment, or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The computer-usable or computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer-readable program code, such that when the computer-readable program code is executed on a computer, the execution of this computer-readable program code causes the computer to transmit another computer-readable program code over a communication link. This communication link may use a medium that is, for example, without limitation, physical, or wireless.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for initiating an outgoing call from a cellular handset to a fixed network using a DECT base station comprising:

receiving an outgoing call request in cellular handset voice data format from a cellular handset by a removable adaptor module in communication with the cellular handset, said removable adaptor module removably coupled externally to a data port of the cellular handset, the outgoing call request including a request to establish a call session with a communication device over a fixed network;

converting, at the removable adaptor module, the cellular handset voice data to DECT voice data;

sending a call set-up message in DECT voice data format to a DECT base station in response to receiving the outgoing call request, the DECT base station configured to initiate an outgoing call to the communication device over the fixed network in response receiving the call set-up message; receiving a call connect message from the DECT base station; and establishing a call session between the cellular handset and the communication device.

2. The method of claim 1, wherein the sending of the call set-up message to the DECT base station includes sending the call-setup message over a DECT air interface.

3. The method of claim 1 further comprising:
receiving DECT voice data associated with the call session from the DECT base station;
converting the DECT voice data to cellular handset voice data; and
sending the cellular handset voice data to the cellular handset.

4. The method of claim 1, wherein the adaptor module is configured to be interchangeably coupled to a data port of a second cellular handset.

5. The method of claim 1, wherein the fixed network comprises at least one of a PSTN and an IP network.

6. A method for receiving an incoming call from a fixed network by a cellular handset using a DECT base station comprising:
receiving a call set-up message in DECT voice data format from a DECT base station by a removable adaptor module, the removable adaptor module removably coupled externally to a data port of the cellular handset, the call set-up message associated with an incoming call from a communication device over a fixed network;
converting, at the removable adaptor module, the DECT voice data to cellular handset data;
sending an incoming call request in cellular handset data format to a cellular handset in communication with the removable adaptor module, the incoming call request including a request to establish a call session with the communication device; receiving an incoming call acknowledgement from the cellular handset; sending a call connect message to the DECT base station; and
establishing a call session between the cellular handset and the communication device.

7. The method of claim 6 further comprising, wherein the sending of the call connect message to the DECT base station includes sending the call connect message over a DECT air interface.

8. The method of claim 6 further comprising:
receiving cellular handset voice data from the cellular handset; converting the cellular handset voice data to DECT voice data; and
sending the DECT voice data to the DECT base station.

9. The method of claim 6, wherein the adaptor module is configured to be interchangeably coupled to a data port of a second cellular handset.

10. The method of claim 6, wherein the fixed network comprises a PSTN.

11. The method of claim 6, wherein the fixed network comprises an IP network.

12. A standalone cellular to DECT adaptor module comprising:
a data interface configured to be externally coupled to a data port of a cellular handset; a DECT transceiver; and
at least one processor configured to:
establish a call session between a cellular handset and a communication device over a fixed network; receive DECT voice data associated with the call session from a DECT base station via the DECT transceiver, the DECT base station in communication with the fixed network; convert the DECT voice data to cellular voice data; send the cellular voice data to the cellular handset via the data interface; and
receive cellular voice data associated with the call session from the cellular handset via the data interface; convert the cellular voice data to DECT voice data; send the DECT voice data to the DECT base station via the DECT transceiver.

13. The standalone cellular to DECT adaptor module of claim 12, wherein the data port is a USB port.

14. The standalone cellular to DECT adaptor module of claim 12, wherein the data port is a mini-SD port.

15. The standalone cellular to DECT adaptor module of claim 12, wherein the at least one processor is further configured to:
receive an outgoing call request from the cellular handset, the outgoing call request including a request to establish a call session with a communication device over a fixed network; send a call set-up message to the DECT base station in response to receiving the outgoing call request, the DECT base station configured to initiate an outgoing call to the communication device over the fixed network in response receiving the call set-up message; and
receive a call connect message from the DECT base station.

16. The standalone cellular to DECT adaptor module of claim 12, wherein the at least one processor is further configured to:
receive a call set-up message from the DECT base station, the call set-up message associated with an incoming call from the communication device over the fixed network; send an incoming call request to the cellular handset in communication, the incoming call request including a request to establish the call session with the communication device; receive an incoming call acknowledgement from the cellular handset; and
send a call connect message to the DECT base station.

17. The standalone cellular to DECT adaptor module of claim 12, wherein the fixed network comprises at least one of a PSTN and an IP network.

* * * * *